July 26, 1932.   O. T. THOMPSON   1,869,177
SANITARY NAPKIN AND MACHINE FOR MAKING SAME
Filed Feb. 18, 1928   9 Sheets-Sheet 2

Fig.2

Inventor
Oscar T. Thompson
Fisher, Fowle, Clapp + Soans Attys.

July 26, 1932. O. T. THOMPSON 1,869,177
SANITARY NAPKIN AND MACHINE FOR MAKING SAME
Filed Feb. 18, 1928 9 Sheets-Sheet 4

July 26, 1932.　　　O. T. THOMPSON　　　1,869,177
SANITARY NAPKIN AND MACHINE FOR MAKING SAME
Filed Feb. 18, 1928　　　9 Sheets-Sheet 5

Fig.5

Inventor
Oscar T. Thompson
Fisher, Soule, Clapp & Soans
Attys.

July 26, 1932.  O. T. THOMPSON  1,869,177
SANITARY NAPKIN AND MACHINE FOR MAKING SAME
Filed Feb. 18, 1928   9 Sheets-Sheet 6

Inventor
Oscar T. Thompson

Patented July 26, 1932

1,869,177

UNITED STATES PATENT OFFICE

OSCAR T. THOMPSON, OF NEENAH, WISCONSIN, ASSIGNOR, BY MESNE ASSIGNMENTS, TO INTERNATIONAL CELLUCOTTON PRODUCTS CO., OF CHICAGO, ILLINOIS, A CORPORATION OF DELAWARE

SANITARY NAPKIN AND MACHINE FOR MAKING SAME

Application filed February 18, 1928. Serial No. 255,246.

This invention relates to sanitary napkins and machines for making the same. The principal object of the invention is to provide a machine for making an improved sanitary napkin which includes a filler pad of absorbent wadding and a wrapper of gauze. Another object of the invention is to provide an improved sanitary napkin in which the filler pad portion is provided with rounded or tapered end portions, and it is also an object of this invention to provide a machine for making napkins having such filler pads.

Another object of the invention is to provide mechanism whereby the adjacent ends of a plurality of superposed sheets of crepe paper, which are preferably used in the present instance for forming the filler pads, are joined or welded together so as to prevent shifting of some of the sheets relative to others, and so as to seal the ends, thereby to prevent progression of moisture through the ends of the pads. A still further object of the invention is to provide improved mechanism for feeding a supply strip of wadding to mechanism for cutting the strip into individual pads.

Still another object of the invention is to provide convenient and easily accessible means for supporting a supply of wrapper material such as gauze, which means is so arranged or positioned relative to other parts of the machine that the supply will be maintained clean, i. e., free from lint from the wadding, oil from the working mechanism of the machine, and other dirt which might otherwise find its way to the supply of wrapper material.

This invention constitutes an improvement over the pad making machine shown in the application of William Bauer for pad making machine, Ser. No. 687,012, and it is a general object of the invention to provide an improved machine of the class described.

Further objects and advantages of the invention will be understood by reference to the following specification and accompanying drawings in which I have illustrated a machine for making sanitary napkins according to the present invention and also the pad formed by the machine disclosed.

The machine for making sanitary napkins according to the present invention consists generally, of a support 20 for a strip of wadding, a mechanism 21 for advancing the strip of wadding step by step, a cutter 22 for separating forward end portions from the strip to form pads, a conveyor 23 for propelling a strip of gauze 24, mechanism indicated at 25 for feeding the pads into the strip of gauze and to the folding mechanism, part of which is indicated at 26, for folding the sides of the gauze around the pad to enclose the same.

The wadding support and feeding mechanism is best shown in Figs. 1, 3, 5, 6, 7, 8, 9 and 13. The wadding support consists preferably of an elongated table member 27 which is supported at one end by a main frame 29 and at its other end by means of one or more braces 30 which extend between a part of the main frame and the outer end portion of the table 27. The table is divided into three longitudinally extending sections 31, 32 and 33 which are separated by longitudinally extending spaces or slots 34 and 35, (see Fig. 13). The inner edges of the sections 31 and 33 of the support are provided with Z-shaped angle irons 36 and 37 respectively, which are secured to the respective table sections and serve as guides for the strip of wadding, as will hereinafter become apparent. Upstanding brackets 38 and 39 are provided for rotatably supporting a roll 40 of absorbent wadding. The strip of wadding 41 which is drawn from the roll 40 by the feed mechanism which will hereinafter be described, extends downwardly from the roll and lies flat on the supporting table 20, and is guided longitudinally by means of the Z-shaped irons 36 and 37. A stop 42 is provided adjacent the outer end of the wadding supporting table for preventing excessive unwinding of the strip from the roll and for guiding the strip onto the table.

Figures 3, 16:
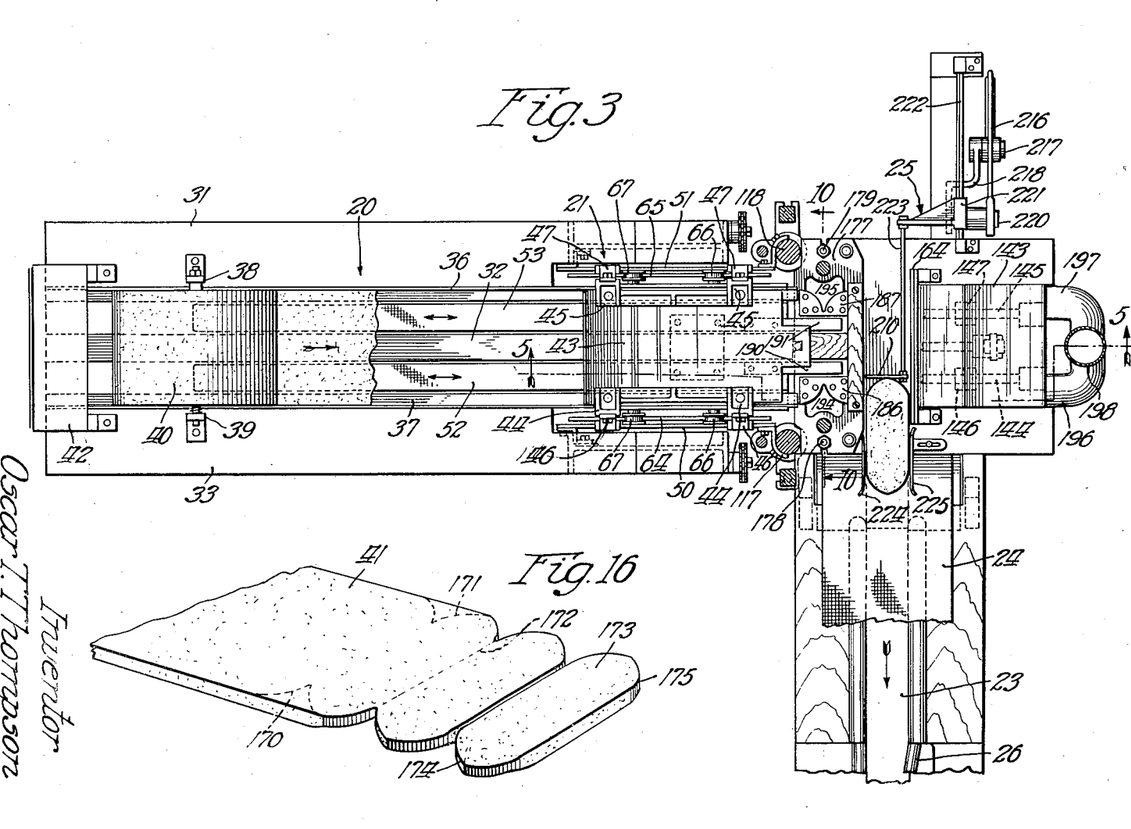
Figs. 3 and 4 are sections on the lines 3—3 and 4—4 respectively, of Fig. 1.
Figs. 14 and 15 are side and edge views respectively of a detail of construction and Fig. 16 is a perspective illustrating the method of cutting the round end pads.
Figures 8, 9:
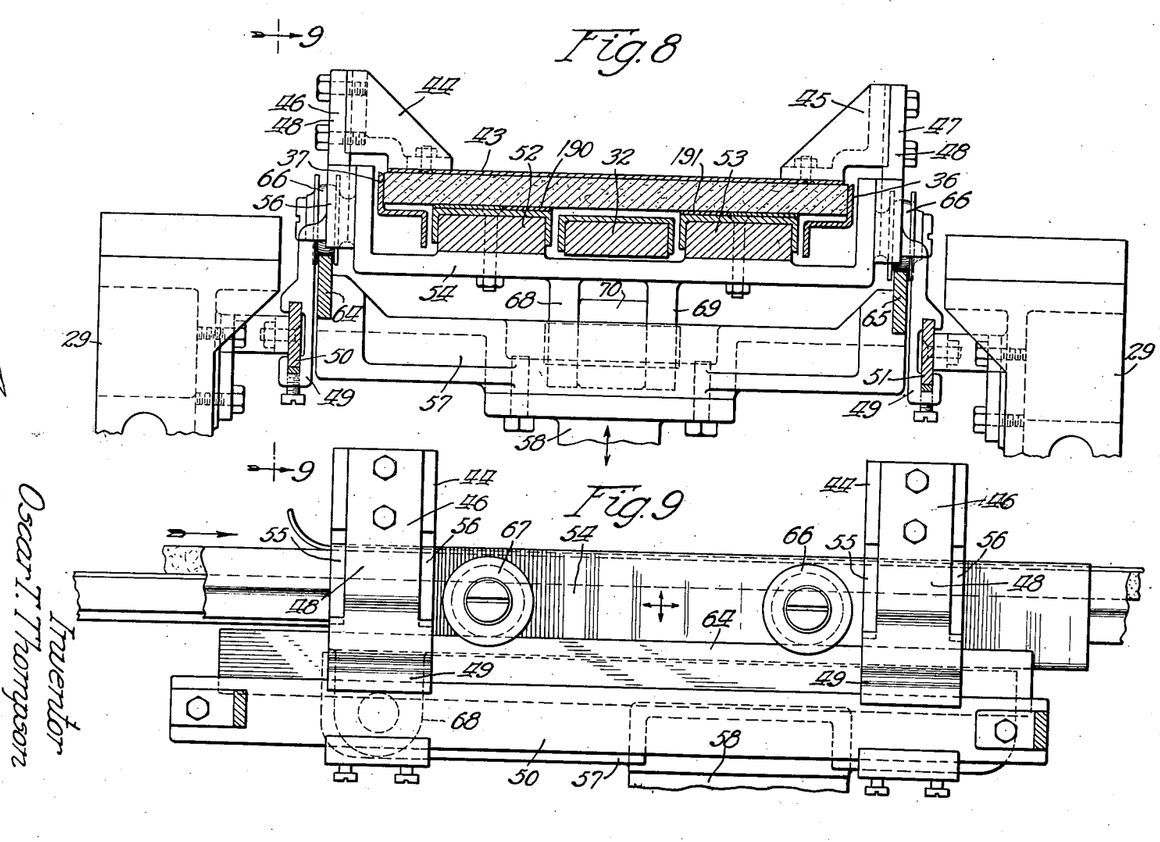
Fig. 8 is a section on the line 8—8 of Fig. 1.
Fig. 9 is a section on the line 9—9 of Fig. 8.

The wadding feed mechanism is arranged to grip a portion of the wadding, lift the same from contact with the above described supporting table, and to advance the strip a predetermined distance, after which the wadding strip is released and permitted to lie flat on the supporting table while the gripping mechanism is returned to starting position for repeating the feeding operation. The feeding mechanism includes a top plate or gripping member 43 which is secured by means of pairs of brackets 44 and 45 to the upper ends of pairs of brackets 46 and 47 respectively. Each of the brackets 46 and 47 comprises an upper guide portion 48 and an outwardly offset portion 49 which is recessed to slidingly fit over tracks or guides 50 and 51, the brackets 46 being slidable on the guide 50, and the brackets 47 being slidable on the guide 51. The guides 50 and 51 are fixedly secured by suitable brackets to the main frame 29 as best shown in Figs. 3 and 8. It will be noted that the top plate or gripping member 43 is thus mounted so as to be horizontally movable but vertically stationary.

Figure 4:
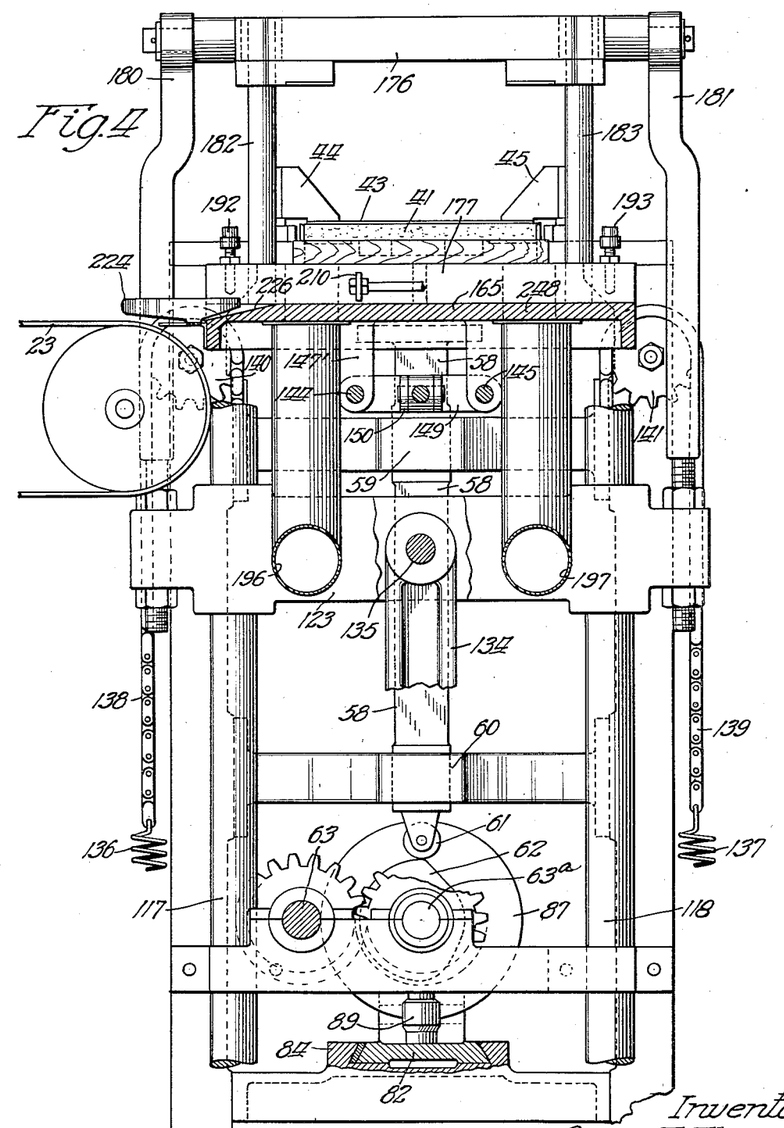

For cooperating with the top gripping member 43, I provide lower or bottom gripping members 52 and 53 which are elongated bar-like members disposed in the spaces or slots 34 and 35 of the wadding support 20. The forward end portions of the lower gripping members 52 and 53 are secured to a bracket 54 which extends crosswise of the support and is provided with upwardly extending end portions, each provided with guide lugs 55 and 56, which embrace the upper guide portions 48 of the respective brackets 46 and 47. The bracket 54 with its guide lugs 55 and 56 is thus effective to connect the lower gripping members 52 and 53 to the upper gripping member in such a way that the upper and lower gripping members are vertically movable, but horizontally fixed relative to each other. For effecting vertical movement of the lower gripping members relative to the upper gripping member, I provide a head or bracket member 57 which is secured to a vertically reciprocable plunger 58, the latter being slidably mounted in bearings 59 and 60, which are provided in cross members forming a part of the main frame 29 as best shown in Fig. 4. The lower end of the plunger 58 is provided with a roller 61 which engages a rotatable cam 62, which is secured to a shaft 63a. The shaft 63a constitutes a counter-shaft and is driven through gears by the main power shaft 63 of the machine, which main shaft may be rotated by any suitable means, one of which will presently be described.

The bracket member 57 which is carried by the upper end of the reciprocating plunger 58 is provided on opposite sides with track members 64 and 65 which are fixedly secured to the bracket. Rollers 66 and 67 which are rotatably mounted on the upwardly extending portions of the bracket 54 engage the upper edges of the tracks 64 and 65 so as to support the bracket 54 and lower gripping members 52 and 53. The rollers permit horizontal movement of the bracket 54 and lower gripping members along the tracks 64 and 65, while also being effective to transmit vertical movement of the plunger 58, bracket 57 and tracks 64 and 65 to the bracket 54 and gripping members 52 and 53.

Figure 1:
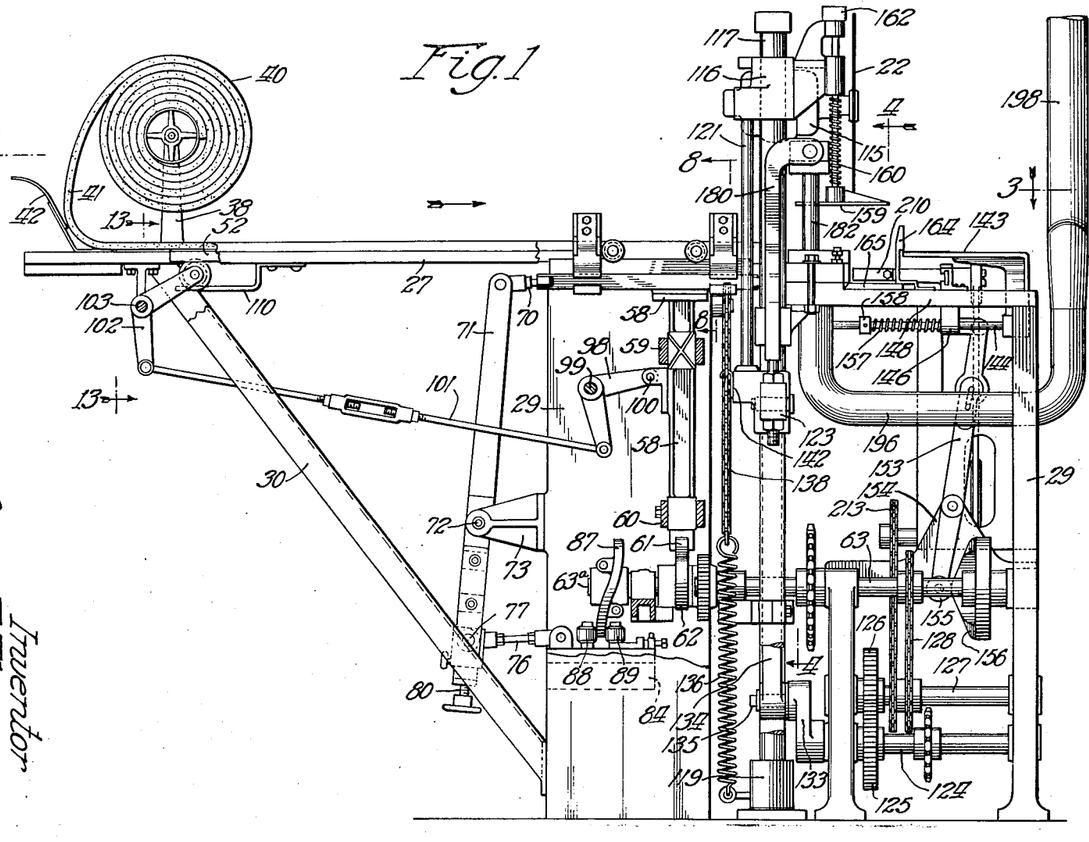
Fig. 1 is a side elevation.
Figure 5:
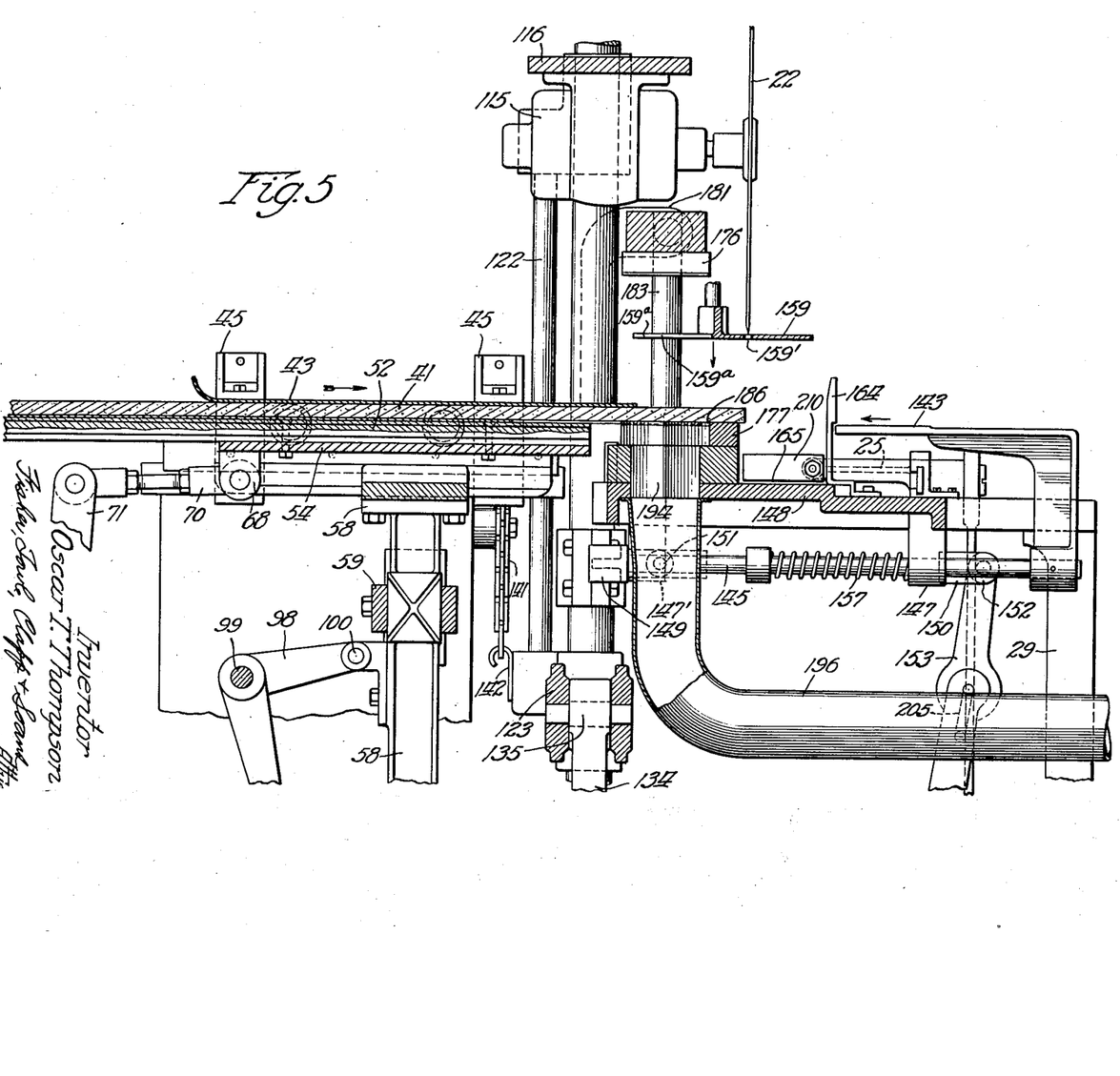
Fig. 5 is a section on the line 5—5 of Fig. 3.
Figure 6:
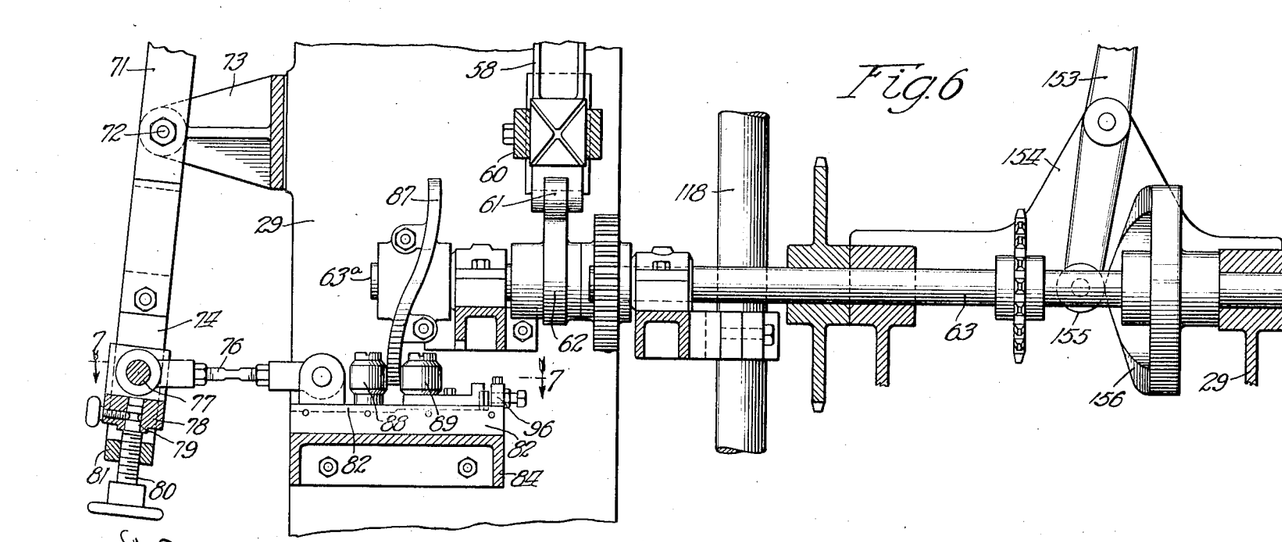
Fig. 6 is an enlarged detail view partly in section of a part of Fig. 1.
Figure 7:
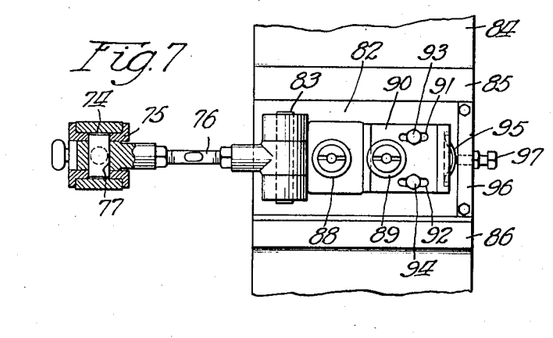
Fig. 7 is a plan section on the line 7—7 of Fig. 6.

For effecting horizontal movement of the upper and lower gripping members, I provide the bracket 54 with a pair of depending lugs 68 and 69 between which a link 70 is pivoted at one end, and which link is pivotally connected adjacent its outer end to the upper end of a lever 71 as best shown in Figs. 1 and 5. The lever 71 extends downwardly and is pivotally mounted intermediate its ends as shown at 72 on a bracket 73, which is secured to the main frame 29. The lower end of the lever 71 is provided with a slotted portion, as indicated at 74, which slotted portion may be made integral with the lever or constructed in any suitable manner. Slidably mounted in the slotted portion 74 of the lever is a mounting member 75 which is in effect a U-shaped member, and between the sides of which a link 76 is pivoted adjacent one end as shown at 77. The bottom portion 78 of the U-shaped mounting member 75 is provided with an aperture 79 which receives an end portion of an adjusting screw 80, the latter threadedly engaging the end portion 81 of the lever 71. The upper end portion of the adjusting screw 80 is anchored to the mount 78 in any suitable manner so that by turning the screw 80, the mount 78 will be caused to move upwardly or downwardly in the slot 74. By this means, it will be noted that the distance between the centers of the pivot 77 and pivot 72 can be adjusted to effect adjustment of the throw of the upper end of the lever 71.

The other end of the link 76 is pivotally connected to a block 82 as shown at 83 and the block 82 is slidably mounted on a cross member 84, which is connected to the main frame 29 and constitutes a part thereof. Any suitable means may be provided for slidably mounting the block 82, and in the present instance, the block is slidable between ribs 85 and 86 which are formed on the cross member 84, and which may be undercut to receive outwardly projecting portions of the block 82. A rotating cam 87 is secured to the counter-shaft 63a of the machine so as to rotate with the shaft and a pair of rolls 88 and 89, which are rotatably mounted or connected to the sliding block 82, are provided for transmitting movement to the sliding block from the cam.

One of the rollers, for instance the roller 89 is mounted on the sliding block so as to be yieldingly held in operative position adjacent the roller 88 thereby to accommodate such variations in active thicknesses of the cam 87 as may be incident to the form of cam shown. For so mounting the roller 89, I provide a member 90 having slots 91 and 92 extending therethrough and through which slots, bolts 93 and 94 extend into threaded engagement with the sliding member 82. The bolts 93 and 94 are of course effective to maintain the member 91 in contact with the member 82 and to permit sliding movement of the latter relative to the main sliding block 82. A yielding spring, preferably a flat spring 95 is interposed between an end portion of the member 90, and an upwardly extending portion 96 on the sliding block 82 for yieldingly urging the member 90 and roller 89 towards the roller 88. An adjusting screw 97 may be provided for adjusting the pressure of the spring 95 on the sliding member 90. It will be readily understood that when the cam 87 rotates, the member 82 will be reciprocated and will rock the lever 71 about its pivot 72 so as to effect horizontal movement of the upper and lower gripping members 43, 52 and 53 thereby to feed the wadding forwardly.

Figure 13:
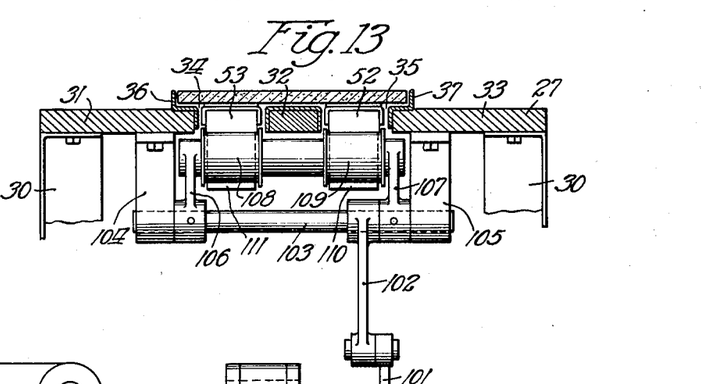
Fig. 13 is a section on the line 13—13 of Fig. 1.

The above described mechanism for moving the lower gripping members 52 and 53 upwardly, to grip or clamp the wadding against the upper gripping member 43 is effective to move the outer or forward end of the members 52 and 53 upwardly. In order to maintain the strip of wadding in horizontal position so as to facilitate handling and feeding thereof, I provide mechanism which operates as an incident to the vertical movement of the forward end of the members 52 and 53. This mechanism includes a bell crank 98 pivoted at 99 to the main frame 29 and having one of its arms pivotally connected as shown at 100, to the reciprocating member 58. The other arm of the bell crank 98 is connected by means of a link 101 to a lever 102 which is secured to a shaft 103, and which shaft is rotatably mounted in brackets 104 and 105 secured to the supporting table parts 31 and 33 respectively, (see Fig. 13). Arms or levers 106 and 107 are secured to the shaft 103 so as to rotate therewith and the said arms 106 and 107 carry a pair of rollers 108 and 109, which may be independent of each other or constructed as an integral unit. The rollers 108 and 109 are preferably rotatably supported in the outer ends of the arms 106 and 107. Hangers or brackets 110 and 111 are secured to the rear end portions of the lower gripping members 52 and 53 respectively so as to form guides for receiving the rollers 108 and 109. The rollers 108 and 109 are, as shown in Fig. 13, of such dimension that they fit closely between the guides 110 and 111 and respective gripping members 52 and 53 so that when the shaft 103 is rotated or oscillated, the gripping members 52 and 53 will be elevated. In Fig. 1, the parts are shown as they appear when the lower gripping members 52 and 53 are raised and moved forwardly. It will be apparent that when the plunger 58 is lowered, the shaft 103 will be rotated through the link 101 and other parts so that the rear end of the members 52 and 53 will be lowered, the brackets 110 and 111 serving to cause the rollers to positively lower the rear end portions of the gripping members in unison with the forward end portions adjacent the reciprocating member 58.

Figure 2:
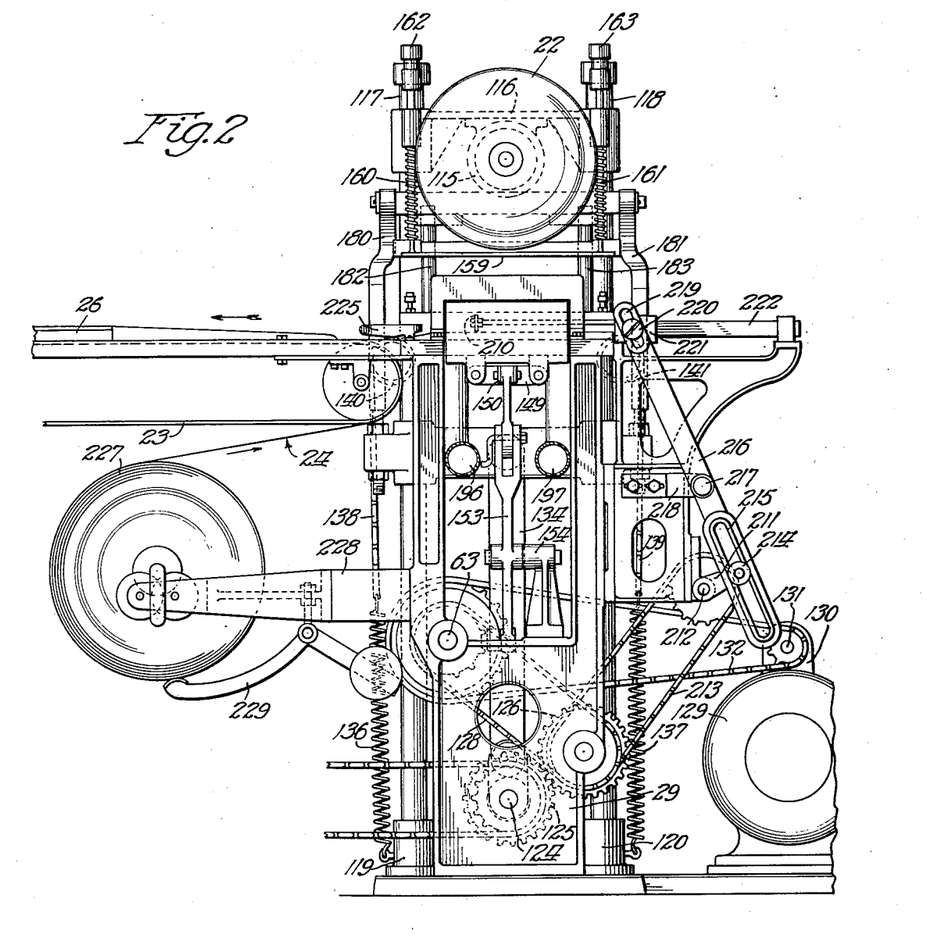
Fig. 2 is an end elevation of the right hand end of Fig. 1.

The cutter 22 is operative to sever forward end portions from the strip so as to form individual, relatively long but narrow filler pads, and is preferably a rotating saw or knife, which is secured to the shaft of an electric motor 115 which may be connected to an electric power line by means of flexible conductors. The motor 115 is secured to a crosshead 116 which is vertically slidably mounted on upwardly extending posts 117 and 118. The posts may be secured to the main frame or supported by suitable means directly on the floor as shown in Figs. 1 and 2 by means of feet 119 and 120. The crosshead 116 is connected by means of rods 121 and 122 to another crosshead 123 which is also vertically slidably mounted on the posts 117 and 118, and mechanism is provided for reciprocating the crosshead 123 and incidentally the crosshead 116 on the posts 117 and 118. This mechanism includes a shaft 124 rotatably mounted in suitable bearings provided in the main frame and rotatably driven by means of gears 125 and 126, the latter being secured to a shaft 127 which is rotated by means of a chain 128 which engages suitable sprockets secured to the shaft 127 and main power shaft 63. The main shaft 63 may be rotated by any suitable means such as for instance, an electric motor 129, and suitable speed reducing mechanism indicated at 130 being provided to drive a shaft 131 at proper speed and a chain 132 being provided and engaging sprockets secured to the shafts 131 and 63 for transmitting rotation from the shaft 131 to the power shaft 63.

The inner end of the rotating shaft 124 is provided with a crank arm 133 and a link 134 is pivotally secured at its lower end to the end of the crank arm as shown at 135. The upper end of the link 134 is pivotally connected as shown at 135 (see Figs. 4 and 5) to the crosshead 123, which is slidably mounted on the posts 117 and 118 and connected by means of the rods 121 and 122 to the upper, cutter carrying crosshead 116. It will be apparent that when the shaft 124 is rotated, the crank 133 and link 134 will be effective to impart vertical reciprocating motion to the crosshead 123 and parts connected thereto. For assisting the crank and link to raise the cutter mechanism, I provide tension springs 136 and 137 which are connected at their lower ends to fixed parts of the machine, for instance, as shown in Figs. 1 and 2 to the foot members 119 and 120. The upper ends of the springs are connected to chains 138 and 139 which extend upwardly and around sprockets 140 and 141, which are rotatably mounted on portions of the main frame 29. The other ends of the chains are connected in any suitable manner to the reciprocating crosshead 123. In the present instance, I have shown hooks such as shown at 142 in Figs. 1 and 5 for connecting the chain to the crosshead 123. The chain and spring mechanism in addition to facilitating upward movement of the cutting mechanism also serves to prevent vibration thereof because of the constant tension of the springs 136 and 137.

The mechanism for feeding the wadding strip forwardly and the mechanism for reciprocating the cutter is so synchronized that the cutter is lowered during the interval between feeding movement of the strip, and the cutter is operative to sever the forward end portion of the strip so as to form an individual pad of relatively long and narrow dimensions. The length of the pad corresponds to the width of the strip of wadding and the width of the pad is equal to the length of forward or feeding movement imparted to the strip by each feeding movement of the feeding mechanism.

For facilitating the cutting operation, I provide a horizontally movable table or support 143 which is carried by a pair of spaced rods 144 and 145, which rods are slidably mounted in bearings 146 and 146', and 147 and 147' respectively. The bearings 146 and 147 are formed as a part of a table member 148 and are disposed on the underside thereof. The table 148 is supported by suitable parts of the main frame structure 29.

A crosshead 149 is secured to the inner ends of the rods 144 and 145 (see Fig. 5), the crosshead being disposed and movable between the posts 117 and 118. Reciprocating movement is imparted to the support 143 through the agency of the rods 144 and 145 and crosshead 149 by means of a link 150 which is pivotally connected at one end to the crosshead 149 as shown at 151, and pivotally connected at its other end as shown at 152 to the upper end of a lever 153. The lever 153 is pivotally mounted intermediate its upper and lower ends on a bracket 154 and the lower end of the lever 153 carries a roller 155 which engages a rotating cam 156. The cam 156 is secured to the main power shaft 63 and is accordingly rotated. The cam is of suitable shape to oscillate the lever 153 about its pivotal mounting on the bracket 154, compression springs such as shown at 157 being disposed about the rods 144 and 145 and interposed between the stationary bearing members 146 and 147, and collars such as 158 secured to the respective rods so that the cam acts against the pressure of the springs when moving the lever in the direction for shifting the support 143 to its outward position as shown most clearly in Figs. 1, 3 and 5.

The operation of the cam 156 is so timed with respect to the mechanism for feeding the wadding strip forwardly, that the support 143 is moved to its inward position, to the left in Fig. 1, so that the forward end portion of the strip of wadding will lie on the support when the cutting operation is effected. Hence, when the cutter 22 is lowered to cut the wadding, the outer end portion of the wadding is supported in its normal position and a clean and true cut is effected.

For further facilitating the cutting operation, I provide a presser foot or shoe 159 which is carried by means of rods 160 and 161, the latter being slidably mounted in suitable bearings provided as a part of the upper croshead 116. The rods 160 and 161 are provided with heads 162 and 163 respectively, which prevent the rods from dropping out of the bearing members, and coiled compression springs as clearly shown in Figs. 1 and 2, are disposed about the rods between the presser foot and bearing member to yieldingly hold the presser foot in its lowermost position. It will be understood that when the cutter is lowered, the presser foot 159 first engages the strip of wadding which is then supported partly on the support 143 and serves to hold the wadding in place while the cutter performs the cutting operation. The presser plate is of course provided with a suitable slot 159' for permitting the cutter 22 to continue its downward movement to cut the wadding after the presser foot reaches the limit of its downward movement.

The springs around the rods 160 and 161 permit continued downward movement of the cutter while the presser foot remains stationary.

After the forward end portion of the strip of wadding has been thus severed, the next movement of the support 143 is in an outward direction to the position shown in Fig. 1, and a stripper member 164, which bridges the support 143, serves to strip the separated wadding portion or pad from the support and to deposit the pad on a portion 165 of the table 148.

Figures 14, 15:
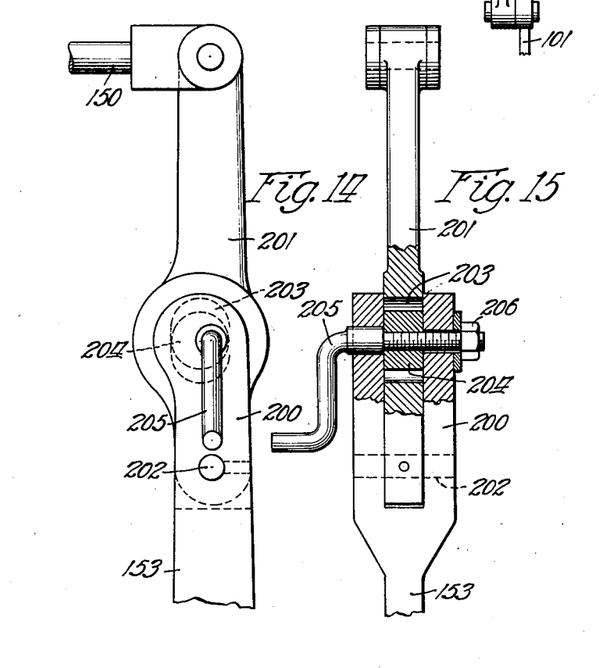

It is of course important that the support 143 be adjusted relative to the line along which the cutter 22 cuts the wadding, and for facilitating proper setting or adjusting of the support and its limits of movement, I provide an adjusting mechanism most clearly shown in Figs 14 and 15. It will be seen that the lever 153 is provided with a forked upper end portion 200 which is adapted to receive an independent extension member 201. The extension 201 is pivoted, as indicated at 202, adjacent its lower end to the forked end of the lever 153 and is provided with an elongated slot 203 spaced upwardly from its pivot 202. An eccentric adjusting device including a circular member 204 and a crank 205 is provided for swinging the extension 201 about its pivot 202 so that the position of the support 143 will be adjusted through the agency of the link 150, which is connected to the upper end of the extension 201. The circular member 204 is eccentrically mounted on the crank 205 so as to rotate therewith when the crank is turned, and suitable means such as a nut and washer, indicated at 206 may be provided for locking the device in the desired position of adjustment.

The mechanism which I have so far described is operative to successively cut square ended pads from the forward end of the strip of wadding. Suitable mechanism, for instance, such as shown in the above mentioned application of William Bauer, may be provided for enclosing or wrapping the pad in a wrapper of gauze or the like, thereby to form a complete sanitary napkin in which the filler pads have square ends. According to the present invention, I desire to provide pads having tapered or round ends, and for this purpose I provide mechanism, which I will now proceed to describe.

From an inspection of Fig. 16, it will be readily understood that I may conveniently produce pads having rounded or tapered ends by first notching oppositely disposed edge portions of the strip of wading 41, as indicated by the broken lines 170 and 171 and subsequently cutting the forward end portion of the strip along a line extending between the vertices of the notches as indicated by the broken line 172. By this arrangement, pads 173 having rounded ends such as shown at 174 and 175 may be produced.

For effecting notching of the opposite edge portions of the strip of wadding, I provide punch and die members 176 and 177 disposed in the path of movement of the strip of wadding and having cooperating cutting portions adapted to cut notches of the desired shape in the opposite edges of the wadding strip. The lower die member 177 is fixedly mounted on the table 148, preferably by means of bolts 178 and 179 which extend through open ended slots or notches provided in the opposite ends of the die member and similar open ended slots provided in the edges of the table member 148. Suitable dowel pins or guides may be provided for accurately positioning the lower die member 177 on the table 148.

Figures 11, 12:
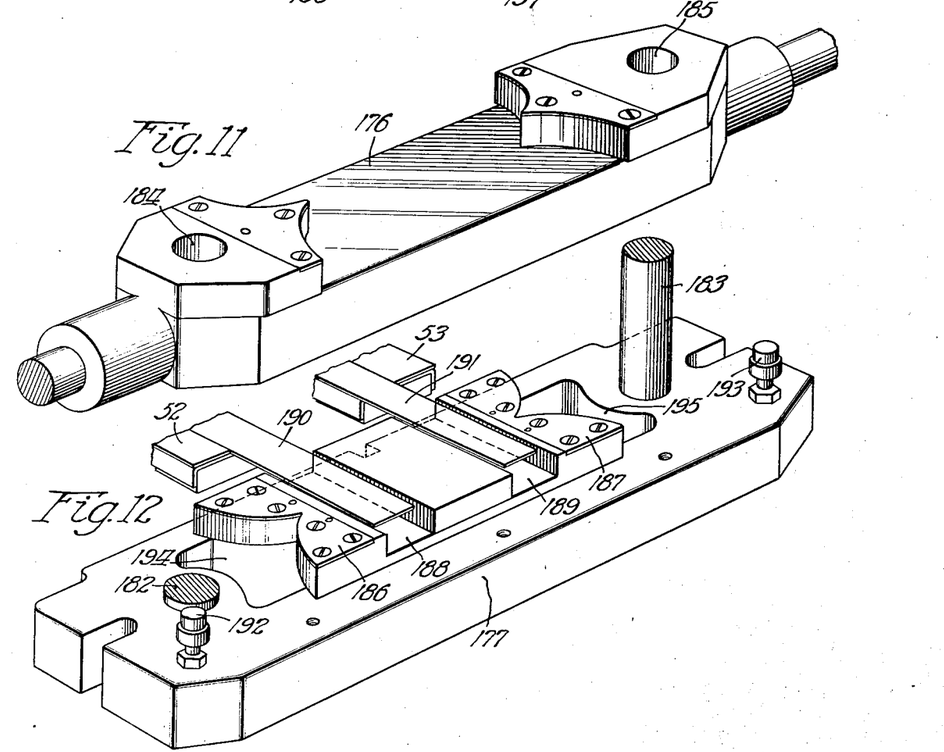
Figs. 11 and 12 are perspectives of upper and lower die members which serve to cut round ends on the pads.

The upper die member 176 shown in inverted position in Fig. 11 is pivotally mounted adjacent its ends in brackets or arms 180 and 181 which extend upwardly from the lower vertically reciprocable crosshead 123. Guide pins such as shown at 182 and 183 fixedly mounted or secured to the lower die members and slidable through apertures 184 and 185 in the upper member may be provided for guiding and causing the upper and lower die members to register with one another, thereby to insure accurate and clean cut notching of the wadding strip. It will be apparent that the upper die member will be reciprocated upwardly and downwardly in unison with the cutter, since the die member is carried by arms which are supported by the lower crosshead 123 which also constitutes part of the structure which supports the cutter. The die members 176 and 177 are spaced rearwardly from the cutter 22 so that the vertices of the notches which the dies cut in the wadding strip will be disposed in the line along which the wadding is to be cut to form an individual pad. It will be understood that the notching dies affect their notching operation simultaneously with or slightly after the cutter 22 performs its cutting operation, the wadding strip being fed forwardly an amount equal to the width of the pad.

The lower die member 177 is formed with its cutting portions 186 and 187 raised from the main body of the die member and channels such as indicated at 188 and 189 are provided extending through the said raised portion. The forward ends of the reciprocating lower wadding feed members are provided with extensions in the form of relatively thin metal strips 190 and 191 which extend over the lower die member and are adapted on downward movement of the gripping members 52 and 53 to move in the slots 188 and 189, thereby to lower the strip of wadding onto the lower die member. By this means, the wadding strip is prevented from having sliding engagement with the face of the lower die member, which engagement, if permitted to occur, might tend to injure the bottom face of the strip of wadding. The presser foot 159 is provided with a pair of rearward extensions 159–A, which extend over the raised die portions 186 and 187 so that when the presser foot is lowered, it is operative to firmly hold the wadding strip against the face of the lower die member as well as against the support for the forward end portion of the wadding strip.

Figure 10:
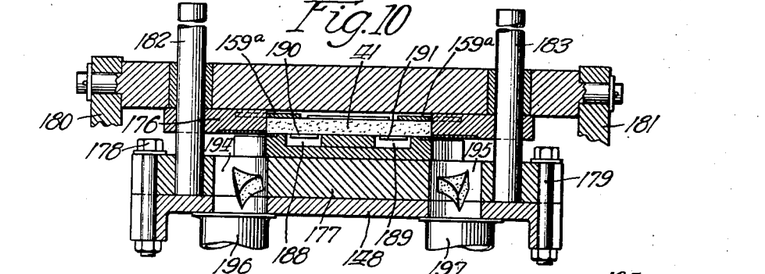
Fig. 10 is a section on the line 10—10 of Fig. 3.

The lower die member 177 is provided with apertures 194 and 195 through which the cut-out edge portions are adapted to pass so as to prevent accumulation of such portions on the die member, and for more effectively removing such cut-out portions, I provide vacuum conveyor tubes 196 and 197 which communicate with the openings 194 and 195 respectively, so as to receive the cut-out pieces as clearly shown in Fig. 10. The vacuum conveyor tubes 196 and 197 are preferably joined into a single vacuum conveyor tube 198 as shown in Figs. 1 and 3, which is connected to a suitable exhaust pump and means for receiving the cut-out wadding pieces.

I find it convenient to provide cushioned bumpers 192 and 193 on the lower die member for limiting downward movement of the presser foot 159, thereby to prevent the presser foot from compressing the strip of wadding more than is necessary or desirable.

After the pad has been deposited on the portion 165 of the table 148, a plunger 210 is actuated to advance the pad from the table onto the strip of gauze 24, which is continuously propelled along with the conveyor 23. The plunger 210 is actuated by means of a crank arm 211 which is secured to a rotating shaft 212. The shaft 212 is rotated by means of a chain 213 which engages suitable sprockets secured to the rotating shaft 127 and shaft 212. The crank arm 211 is provided with a roller 214 on its outer end, which fits in an elongated slot 215 provided in the lower end of a lever 216, which is pivoted intermediate its ends, as shown at 217, on a bracket 218. The upper end of the lever 216 is also provided with an elongated slot 219 and is connected by means of a screw 220 to a bracket 221 which is slidably mounted on a rectangular guide rod 222. The guide rod 222 is fixedly secured to the main frame or other convenient parts of the machine and the bracket 221 is provided with a rectangular opening which closely fits the guide rod so that the bracket is slidable but non-rotatably supported by the guide rod. The plunger 210 is connected by means of a rod 223 to the inner end of the bracket 221 so that when the crank 211 rotates and rocks the lever 216, the plunger will be accordingly reciprocated. Manifestly, the plunger is actuated in timed relation with the cutting mechanism and supporting device 143 so that it will be operative on each forward stroke to feed a pad onto the gauze strip 24.

Guide members 224 and 225 are provided on opposite sides of the path of movement of the pad for guiding the pad in proper position onto the gauze strip, and the guide 225 is preferably adjustably mounted as clearly indicated in Fig. 3. The forward edge portion of the table 248 is beveled or inclined as shown at 226 (Fig. 4) to facilitate forward movement of the pad.

The gauze strip 24 which is folded around the pad by means of the folding device 26, is drawn from a supply roll 227 which is rotatably supported by means of a bracket member 228. A weighted lever 229 is provided for applying friction to the surface of the supply roll 227, thereby to maintain the strip 24 straight and taut in the desired degree so that there will be no excessive length of gauze on the conveyor for any of the pads fed thereto. As shown in Fig. 2, the supply roll 227 of gauze is supported underneath the conveyor and feeding table part of the machine, so that the supply roll is protected from dust, oil or dirt, which might under other circumstances be deposited thereon from the mechanism of the wadding, feeding and cutting parts of the machine. The described arrangement of the gauze supply roll and conveyor thus constituttes an improvement over the arrangement shown in the above mentioned Bauer application, wherein the gauze is fed across a path extending beneath some of the wadding strip, feeding and cutting mechanism.

The folding devices 26 may be of any suitable form which will fold first one side of the strip of gauze upwardly and over the top of the wadding pads and then fold the other side of the strip of gauze upwardly and over the top of the wadding pad, and first folded portion of the gauze. The folding mechanism being well known in the art, and forming no part of the present invention, need not be specifically described.

The above described notching mechanism is effective as an incident to its notching operation to unite or weld the edge portions of the superposed sheets of wadding which form the ends of the pads, the thickness of the ends of the pad being consequently slightly reduced as compared with the thickness intermediate the ends as shown in Fig. 16. It will be understood that the crepe paper sheets which are superposed to form the thickness of the wadding, are of a fibrous nature. When the upper notching die descends and coacts with the lower die member to notch the side edge of the strip of wadding, it will be understood that the fibers of the superposed sheets adjacent the line of cutting are squeezed together in such a way that they will be interlocked with one another and the sheets thereby, in effect, welded together along their edges which subsequently constitute the ends of the pads. This welding of the ends of the pads together, is highly desirable and advantageous in that it serves to prevent shifting of some of the sheets relative to others, and in a measure prevents moisture from proceeding through the ends of the pads. The wrapper which encloses the pads may be cut off square at a distance from the ends of the pad so as to provide attachment flaps.

I am aware that changes may be made in the form, construction and proportion of parts, as well as in the mechanism for actuating the machine without departing from the spirit of the invention, the scope of which should be determined by reference to the following claims, which I desire to have construed as broadly as possible, consistent with the state of the art.

I claim as my invention:

1. In a machine for making sanitary napkins, the combination of a support for supporting a strip of wadding, means for intermittently gripping and moving the wadding strip forwardly, said gripping means having gripping engagement with portions of the wadding strip intermediate its marginal edge portions, a cutter for cutting the forward end portion of said strip from the strip so as to form a pad, and means for enclosing the pad in a wrapper.

2. In a machine for making sanitary napkins, the combination of a support for supporting a strip of wadding, reciprocating means for intermittently gripping and moving the wadding strip forwardly, said gripping means having gripping engagement with portions of the wadding strip intermediate its marginal edge portions, a cutter for cutting the forward end portion of said strip from the strip so as to form a pad, and means for enclosing the pad in a wrapper.

3. In a machine for making sanitary napkins, the combination of means for intermittently feeding a relatively flat strip of wadding forwardly, said means including a movable top member and a movable bottom member, said top and bottom members co-operating to grip an area of the strip intermediate its marginal edge portions, means for effecting relative movement of said top and bottom members towards each other for clamping the strip of wadding therebetween, means for moving said top and bottom members in unison to advance the wadding strip, means for separating the forward end portion of said strip from the strip to form a pad, and means for enclosing the pad in a wrapper.

4. In a machine for making sanitary napkins, the combination of means for intermittently feeding a relatively flat strip of wadding forwardly, said means including a movable top member, a movable bottom member, means for raising said bottom member to clamp the wadding between the top and bottom members, means for moving said top and bottom members in unison to advance the wadding strip, means for separating the forward end portion of the strip from the strip, and means for enclosing said separated end portion in a wrapper.

5. In a machine for making sanitary napkins, the combination of means for intermittently feeding a relatively flat strip of wadding forwardly, said means including a movable top member, a movable bottom member, means for effecting relative movement of said top and bottom members towards each other for clamping the strip of wadding therebetween, means for moving said top and bottom members in unison to advance the wadding strip, means for adjusting the extent of such movement, means for separating the forward end portion of said strip from the strip, and means for enclosing said separated end portion in a wrapper.

6. In a machine for making sanitary napkins, the combination of means for intermittently advancing a relatively flat, horizontally disposed strip of wadding, said means including a stationary supporting table for receiving the strip of wadding, a movable top member disposed over a part of said table, a movable bottom member having a face portion constituting a portion of said supporting table and operative to engage the bottom of the strip of wadding, means for effecting relative movement of said top and bottom members towards each other so as to clamp the wadding strip therebetween, means for effecting substantially horizontal movement of said top and bottom members in unison when the wadding strip is clamped therebetween, thereby to advance the wadding, means for separating the forward end portion of the strip from the strip so as to form a pad, and means for enclosing the pad in a wrapper.

7. In a machine for making sanitary napkins, the combination of a supporting table for receiving a strip of wadding, a movable top member disposed over a part of said table, a movable bottom member adjacent one side of the table, and extending beneath said top member, means for raising said bottom member so as to engage the bottom of the wadding strip and clamp the same against said top member, means for effecting substantially horizontal movement in unison of said top and bottom members when the strip is clamped therebetween, thereby to advance the strip of wadding, means for separating a forward end portion of the wadding strip therefrom so as to form a pad, and means for enclosing the pad in a wrapper.

8. In a machine for making sanitary napkins, the combination of a supporting table for receiving a strip of wadding and having a slot extending lengthwise thereof intermediate its side edges, a movable bar disposed in said slot, a movable top member overlying a portion of said bar, means for moving said bar upwardly towards said top member, thereby to clamp the wadding between said top member and bar, means for effecting lateral movement in unison of said top member and bar when the wadding is clamped there-between, means for successively separating forward end portions of said wadding strip from the strip so as to form pads, and means for successively enclosing the pads in a gauze wrapper.

9. In a machine for making sanitary napkins, the combination of a table for receiving and supporting a strip of wadding, means for intermittently gripping and advancing a strip forwardly, said means comprising a stationary guide member, a gripping member, means for mounting said gripping member on said guide member so as to permit horizontal movement of the gripping member, a second gripping member, means connecting said first and second gripping members, serving to lock the same together so as to be horizontally movable in unison and permitting vertical adjustment of one of said gripping members relative to the other, means for effecting such vertical adjustment, means for effecting horizontal movement of said gripping members, means for separating the forward end portion of said strip of wadding from the strip so as to form a pad, and means for enclosing said pad in a wrapper.

10. In mechanism for making pads for sanitary napkins, the combination of a main frame, means mounted on said frame for supporting a strip of wadding, means for intermittently advancing said strip, said means including a guide member mounted on said main frame, a gripping member horizontally movably mounted on said guide member, a second gripping member connected with said first mentioned gripping member so as to be horizontally movable therewith and movable vertically relative thereto, means for effecting vertical movement of said second mentioned gripping member towards said first mentioned gripping member, said means comprising a vertically movable horizontally disposed track, means secured to said second gripping member and movably mounted on said track whereby the gripping means is horizontally movably supported, means for effecting vertical movement of said horizontally disposed track, means for effecting horizontal movement of said gripping members, and means for separating the forward end portion of the strip from the strip so as to form pads.

11. In mechanism for making pads for sanitary napkins, the combination of a main frame, means mounted on said frame for supporting a strip of wadding, means for intermittently advancing said strip of wadding, said means comprising a horizontally disposed guide member mounted on said main frame, an upwardly extending bracket movably mounted on said guide member, a gripping member secured to said bracket, another bracket vertically slidably mounted on said first mentioned bracket, a second gripping member disposed beneath said first gripping member and mounted on said vertically slidable bracket, whereby said gripping members are horizontally movable in unison and whereby said second gripping member is movable vertically relative to the other gripping member, means for effecting vertical movement of said second gripping member including a vertically movable support, a horizontally disposed track member carried by said support, a roller engaging said track member and rotatably mounted on said vertically slidable bracket member, thereby permitting horizontal movement of said vertically slidable bracket member and gripping member relative to said vertically movable support, means for effecting vertical movement of the support, and means for separating a forward end portion of the strip of wadding from the strip so as to form a pad.

12. In mechanism for making pads for sanitary napkins, the combination of a main frame, means mounted on said main frame for supporting and intermittently advancing a strip of wadding, means for successively notching oppositely disposed side portions of the wadding while the latter is stationary, and means for successively cutting the forward end portions of the strip from the strip along a line extending between oppositely disposed notches, thereby to form pads having end portions of reduced width.

13. In mechanism for making pads for sanitary napkins, the combination of a main frame, means mounted on said main frame for supporting and advancing a strip of wadding, means for notching oppositely disposed side portions of the wadding, and means for cutting the strip along a line extending between oppositely disposed notches, thereby to form pads having end portions of reduced width.

14. In mechanism for making pads for sanitary napkins, the combination of a main frame, means mounted on said main frame for supporting and advancing a strip of wadding step by step, means also mounted on said main frame for successively cutting substantially V-shaped notches in oppositely disposed edge portions of the wadding strip and at a predetermined distance from the forward end thereof, and means for successively cutting said strip cross-wise along a line extending between the vertices of the oppositely disposed notches, thereby to form pads having tapered end portions.

15. In mechanism for making pads for sanitary napkins, the combination of a main frame, means carried by said main frame for supporting and advancing a strip of wadding step by step, means disposed adjacent the forward end portion of said supporting means for cutting V-shaped notches in oppositely disposed edge portions of the strip, means for cutting said strip crosswise between the vertices of oppositely disposed notches, thereby to form a pad having tapered end portions, and means for actuating said notching and cutting mechanism while said strip is held stationary.

16. In mechanism for making pads for sanitary napkins, the combination of a main frame, means carried by said main frame for supporting a strip of wadding, a cutter for successively separating the forward end portion of said strip from the strip thereby to form pads, means spaced rearwardly from said cutting means for successively cutting substantially V-shaped notches in oppositely disposed edge portions of the strip, means for actuating said cutting and notching means intermittently in unison, and means synchronized with said cutting and notching means for advancing the strip of wadding a distance equal to the distance between said cutter and the vertices of the notches cut in said strip, whereby the cutter is intermittently operative to sever the end portion of the strip along a line extending between the vertices of said notches so as to form pads having tapered end portions.

17. In mechanism for making pads for sanitary napkins, the combination of a main frame, means mounted on said main frame for supporting and advancing, step by step, a strip of wadding formed of a plurality of superposed sheets of absorbent material, a punch and die mechanism adjacent the forward end of said support for cutting substantially V-shaped notches in oppositely disposed edge portions of the strip, said punch and die mechanism being incidentally operative to unite the edges, adjacent the notch, of the superposed sheets forming said strip of wadding, and a cutter for cutting the strip crosswise between the vertices of oppositely disposed notches so as to form individual pads.

18. In a machine for making sanitary napkins, the combination of a main frame, means supported by said main frame for supporting a strip of wadding, means for feeding the strip of wadding forwardly, means for successively cutting end portions from the forward end of the strip to form pads, means for receiving flatwise the pads cut from the strip, a conveyor having its receiving end disposed adjacent but spaced horizontally from said pad receiving means, and means for moving said pad laterally in flatwise position from said receiving means onto said conveyor.

19. In a machine for making sanitary napkins, the combination of a main frame, means supported by said main frame for supporting a strip of wadding, means for feeding the strip of wadding forwardly, means for successively cutting end portions from the forward end of the strip to form pads, means for receiving the pads cut from the strip, a conveyor having its receiving end disposed adjacent but spaced horizontally from said receiving means, a support for supporting a supply of gauze, said support being disposed underneath said conveyor and spaced from the operating mechanism of the pad forming mechanism, said conveyor being adapted to receive and propel the gauze, and means for moving the pads from said pad receiving means onto the gauze on said conveyor.

20. In a machine for making sanitary napkins, the combination of a main frame, means supported by said main frame for supporting a strip of wadding, means for feeding the strip of wadding forwardly, means for successively cutting end portions from the forward end of the strip to form pads, means for receiving the pads cut from the strip, a conveyor extending crosswise of the length of said wadding support, having its receiving end disposed adjacent but spaced horizontally from said pad receiving means, and means for moving said pad from said receiving means onto said conveyor.

21. In a machine of the class described, the combination of a main frame, a support mounted on said main frame for supporting a strip of wadding, means for advancing the strip of wadding step by step, a cutter synchronized with said feeding means for successively cutting the forward end portions of the strip from the strip so as to form pads, horizontally movable means for supporting said forward end portion while it is being cut, means for moving said support after the cutting operation is completed, a stripper for stripping the pad from the support as the latter is moved, means for receiving the pad which is stripped from the support, wrapping mechanism for enclosing the pad in a wrapper, said mechanism including a conveyor disposed in substantially the plane of said pad receiving means, and a reciprocating pusher for moving the pad from said receiving means onto said conveyor.

OSCAR T. THOMPSON.